United States Patent [19]

Khanna

[11] Patent Number: 5,395,871
[45] Date of Patent: Mar. 7, 1995

[54] PROCESS OF MAKING A STABLE SOLUTION OF POLY(HYDROXYSTYRENE) FUNCTIONALIZED WITH T-BUTYLOXYCARBONYL GROUPS

[75] Inventor: Dinesh N. Khanna, Flemington, N.J.

[73] Assignee: Hoechst Celanese Corporation, Somerville, N.J.

[21] Appl. No.: 239,096

[22] Filed: May 6, 1994

[51] Int. Cl.$^6$ .......................... C08K 5/06; C08K 5/10; C08L 69/00; C08F 18/24
[52] U.S. Cl. ........................................ 524/283; 524/80; 524/306; 524/537; 526/314
[58] Field of Search ................. 524/80, 283, 558, 306, 524/537; 526/314

[56] References Cited

FOREIGN PATENT DOCUMENTS 0517428 12/1992 European Pat. Off. ............ 526/314

Primary Examiner—Paul R. Michl
Assistant Examiner—Peter Szekely
Attorney, Agent, or Firm—Andrew F. Sayko, Jr.

[57] ABSTRACT

Poly(hydroxystyrene) resins in which a portion of the hydroxyl groups are functionalized with t-butyloxycarbonyl groups ("t-Boc") tend to decompose during drying of the wet solid and on storage in the solid state. Solutions that are more stable than the solid material can be made from the wet freshly synthesized solid by dissolving the wet solid in a solvent that forms an azeotrope with water and then distilling the azeotrope of water and solvent from the solution until the solution contains less than about 1% by weight of water.

20 Claims, No Drawings

PROCESS OF MAKING A STABLE SOLUTION OF POLY(HYDROXYSTYRENE) FUNCTIONALIZED WITH T-BUTYLOXYCARBONYL GROUPS

FIELD OF THE INVENTION

This invention relates to solutions of poly(hydroxystyrene) resins that are functionalized with t-butyloxycarbonyl groups and that are stable during storage.

BACKGROUND OF THE INVENTION

Poly(hydroxystyrene) (PHS) is an excellent resin for use in photoresists and other photosensitive imaging systems. It is particularly useful in the deep ultraviolet region of the spectrum because of its low absorption of light in that region compared with the commonly used novolac resins. PHS resins in which some or all of the phenolic groups are functionalized with t-butyloxycarbonyl ("t-Boc") have advantages over non-functionalized PHS. The t-Boc groups slow the rate of dissolution in base, but are readily removed by traces of acid, which causes decomposition of the t-Boc group to isobutylene and $CO_2$, as illustrated below for the t-Boc derivatized poly(4-hydroxystyrene):

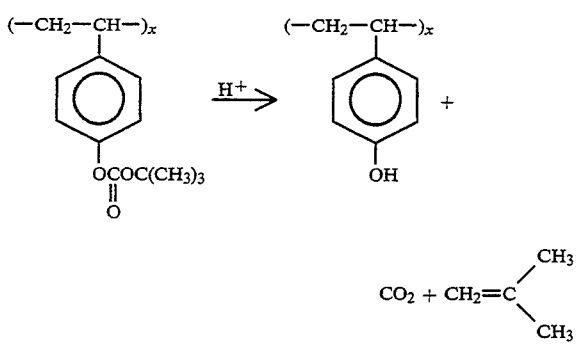

The t-Boc functionalized PHS resins are particularly useful in positive photoresists in which a light sensitive compound is included which releases a trace of acid upon exposure to light. Areas of the resin coating which have been exposed to light dissolve more rapidly in basic developer solutions because of the larger concentration of free phenolic groups. Such resins give improved contrast over novolac resins.

The t-Boc PHS resins are generally made by functionalizing the hydroxyl groups of the preformed PHS polymer with di-t-butyldicarbonate in the presence of a base catalyst. Generally, only a fraction of the hydroxyl groups are converted to t-Boc groups, depending on the desired dissolution characteristics. The functionalized resin is generally precipitated with water, filtered, and dried in a vacuum oven. It is then stored in the dry state until it is to be used in a photoresist composition, at which time it is dissolved in a solvent suitable for coating onto a substrate.

The solid functionalized PHS resin is hard to dry thoroughly because the wet solid hydrolyzes slowly at room temperature and faster when it is warmed. The resin is also hydroscopic. As a result, there are batch to batch variations in the amount of t-Boc functionality in the freshly synthesized polymer. Furthermore, the amount of t-Boc functionality changes with time during storage because the resin in powder form is generally not completely dry. These variations in the level of t-Boc functionality are unpredictable. Because the dissolution rate of coatings made from the functionalized resin varies according to the amount of free hydroxyl in the resin, these variations significantly complicate the use of these resins in photolithography.

SUMMARY OF THE INVENTION

A t-Boc functionalized PHS resin (t-Boc PHS) can be made in the form of a stable solution starting from wet t-Boc PHS resin. The t-Boc PHS resin comprises monomer units I having the formula

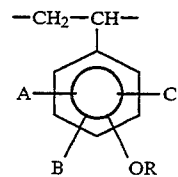

where A, B, and C are alike or different and are selected from the group consisting of H, Cl, F, $C_1$ to $C_4$ alkyl groups and mixtures thereof; where some or all of the groups R are represented by the formula

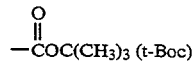

and the remainder of the groups R are H. There may be more than one kind of monomer unit I. Monomer units I may also be part of a copolymer, in which case other monomer units are also present in the polymer. Preferred comonomers are selected from the group consisting of styrene, $C_1$ to $C_4$ alkylstyrene, $C_1$ to $C_4$ alkoxystyrene, chlorostyrene, fluorostyrene, vinylpyridine, and mixtures thereof. The method of making a stable solution of t-Boc PHS comprises the steps of:

(a) dissolving the wet t-Boc PHS resin in a solvent capable of forming an azeotrope with water to form a solution; and (b) distilling the azeotrope of water and solvent from the solution until the solution contains less than about 1% by weight of water.

In preferred embodiments, A, B, and C of monomer units I are methyl or H. In more preferred embodiments, A, B, and C are all H, and the polymer consists essentially of 3-hydroxystyrene and/or 4-hydroxystyrene monomer units, with some or all of the phenolic groups in the form of

The most preferred resins consist essentially of 4-hydroxystyrene monomer units, wherein at least some of the hydroxyl groups are functionalized with t-Boc groups and the remainder are not functionalized. Preferably, about 5% to about 95% of the hydroxyl groups are functionalized with t-Boc groups and the remainder of the hydroxyl groups are not functionalized. More preferably, about 10% to about 75% of the hydroxyl groups are functionalized with t-Boc groups and the remainder are not functionalized.

The dry t-Boc PHS resin solution that is obtained by this process is more stable during storage than the resin in powder form. The t-Boc PHS solution that is made by this process is surprisingly stable and consists essentially of (a) about 5% to about 50% by weight of a resin that consists essentially of 4-hydroxystyrene monomer units, wherein some or all of the phenolic hydroxyl groups are functionalized with t-Boc and the remainder are non-functionalized; (b) less than about 1% by weight of water, preferably less than about 0.6% water; and (c) about 50% to about 95% by weight of propylene glycol methyl ether acetate.

DETAILED DESCRIPTION OF THE INVENTION

The PHS utilized in this invention is preferably the homopolymer of 4-hydroxystyrene, which is conveniently made in pure form by the polymerization of 4-acetoxystyrene, followed by hydrolysis of the acetoxy groups to yield phenolic groups. Other hydroxystyrene isomers (e.g. 2- and 3-hydroxystyrene units) can also be present in the polymer as comonomers. The hydroxystyrene units can be copolymerized with other non-phenolic units, such as styrene, methoxystyrene, or vinyl pyridine. Some or all of the hydroxystyrene units can have additional substituents, as for example 3,5-dimethyl-4-hydroxystyrene monomer units. These partially substituted hydroxystyrene units can also be present in copolymers with other monomers.

The PHS can be functionalized with t-Boc by any of the standard methods for attaching a t-Boc group to a phenol. The amount of functionalization is selected to give a product with the desired dissolution rate. Typically, PHS is dissolved in acetone and is then reacted with di-t-butyl dicarbonate in the presence of a base catalyst, such as 4-dimethyaminopyridine, at room temperature. The t-Boc PHS is then precipitated by pouring the solution into deionized water. After filtration, the filter cake is ready for further processing (e.g. drying in a vacuum if the t-Boc PHS is to be kept in the solid state until it is used).

In the current invention, the wet solid t-Boc PHS is dissolved in a solvent, preferably one that will be used as the solvent for the photosensitive composition in which the t-Boc PHS is to be used. The description of the t-Boc PHS resin as "wet" means that there is still enough moisture in the resin to yield a solution that would be considered "wet". The desired level of moisture in solution at the end of the process is less than about 1% water, preferably less than about 0.6%. The solvent must form an azeotrope with water. The preferred solvent is propylene glycol methyl ether acetate (PGMEA). Other ethylene glycol or propylene glycol diethers, diesters, and ether esters may also be useful as solvents in this invention. The t-Boc PHS is dissolved, and the solvent is then concentrated by distillation. When PGMEA is the solvent, distillation is carried out under reduced pressure with mild heating, e.g. about 15 to about 50 mm Hg pressure, preferably about 20 to 30 mm Hg, in the range of about 25° to about 40° C. The lower temperatures are better because decomposition is reduced. The solution generally is cloudy at the start of distillation if the t-Boc PHS is very wet. As the distillation proceeds, the solution becomes clear because of removal of the water. The amount of water remaining after distillation is easily brought below about 1%, and preferably is below about 0.6%. The solvent is removed by distillation until the desired concentration of t-Boc PHS is achieved, usually about 5% to about 50% solids, and preferably about 10% to about 25% solids. The solution is now ready for use in making photoresists by any of the standard methods used in the industry.

The following examples are illustrative only and not to be treated as limiting the invention in any way.

EXAMPLE 1

The phenolic groups of poly(4-hydroxystyrene) (PHS) were functionalized with t-butyloxycarbonyl groups (t-Boc) to yield a functionalized PHS resin (t-Boc PHS) according to the following procedure. A 1000 ml heated flask equipped with an overhead stirrer, a condenser and a thermometer was purged with nitrogen and maintained under a nitrogen atmosphere. PHS (100gms) was charged to the flask along with 550 ml of acetone. This was stirred for 1 hour at 30° C. to yield a solution. A sufficient quantity of di-t-butyl dicarbonate (33.7 gms, mol wt. 218.5, 0.154 moles) in 53 ml of acetone was added to functionalize about 18.5% of the phenolic groups with t-Boc. Then 4-dimethylaminopyridine (0.13 gms) in 10 ml of acetone was added over 20 minutes to the stirred flask at 30° C. Stirring was continued at 30° C. overnight.

Carbon dioxide was bubbled through a solution of 5.5 l of deionized water and 55 ml of distilled isopropyl alcohol for 10 minutes at 20°–25° C. The bubbling of carbon dioxide was continued for 10 more minutes while the reaction mixture above was poured into it. The temperature was maintained at 20°–25° C. This was mixed for about 30 minutes. Stirring was then stopped, and the mixture was allowed to stand for 15 minutes, after which it was filtered through a Buchner funnel. The solid in the filter was washed with 12 l of deionized water until the conductivity of the rinse water reached a minimum. The wet filter cake at this time weighed 206 gms, and contained 44.8% of t-Boc PHS, the remainder being water. The wet solid was separated into two portions.

One 50 gm portion was placed into a vacuum oven and dried for about 1 day. The dried product weighed 26.6 gms and contained 0.60% water by weight as measured by Karl Fisher titration.

The other portion of the wet solid (156 gms, containing 69.9 gms of t-Boc PHS based on the fact that the wet solid is 44.8% t-Boc PHS) was dissolved in 270.6 gms of propylene glycol methyl ether acetate (PGMEA) by stirring the PGMEA and solid product for about an hour. This solution appeared cloudy due to the presence of the water. The solution was placed under a vacuum of about 35 mm from a vacuum pump and distilled at that pressure. Distillation was very slow when the solution was not heated because the solution cooled as distillate was pumped off. Distillation was then carried out at 30°–35° C. for about an hour and was completed by heating the solution to about 35°–40° C. for about 20 minutes. This resulted in about 75 ml of distillate. The water content of the t-Boc PHS solution in PGMEA remaining after the distillation was measured by Karl Fisher titration as 0.56% by weight.

The two samples were stored in closed containers under nitrogen for several days (8 days for the powder, 6 days for the dry solution), after which the dissolution rates were measured. The solid product was dissolved in PGMEA and then coated onto a substrate. The solution that was dried by removal of a water azeotrope under vacuum was coated directly onto a substrate. The coated substrates were immersed in 0.27M aqueous tetramethylammonium hydroxide solution at 22.0±0.1° C. for one minute, and the amount of coating that was removed by dissolution was measured in A°. The dissolution rates were 6910 A°/minute for the sample that was stored as a solid for 8 days, compared with 2670 A°/minute for the sample that was stored as a dried solution. Since the dissolution rate increases as t-Boc groups are removed, it is apparent that the sample that had been dried and stored as a solid had experienced more extensive hydrolysis of the t-Boc groups than the sample that had been dried in solution and stored as a dried solution.

EXAMPLE 2

A sample of t-Boc PHS was made according to the method of Example 1 by treating PHS with di-t-butyl dicarbonate in acetone and precipitating the product by pouring the solution into water. The solid was filtered and rinsed with deionized water, as in Example 1. The wet solid contained 30% water by Karl Fisher titration. A portion of the wet solid (100.0 gms) was dissolved in 250 ml of PGMEA. The solution was placed under a vacuum from a vacuum pump. Water was removed as an azeotrope with PGMEA under vacuum without heating of the flask, so that the temperature of the t-Boc PHS in PGMEA never went above 25° C. The distillation stopped after all the water plus a small amount (about 6 ml) of PGMEA had been removed. This sample of t-Boc PHS in PGMEA contained about 0.06% water by Karl Fisher titration. This sample was stored in a closed container for about 8 months. Its dissolution rate after storage was measured to be 3860 A°/minute by the method used in Example 1. This is considerably better than the sample made as a dry solid and stored for 8 days by the conventional method in Example 1.

It is to be understood that the above described embodiments of the invention are illustrative only and that modification throughout may occur to one skilled in the art. Accordingly, this invention is not to be regarded as limited to the embodiments disclosed herein.

We claim:

1. A method of making a stable solution of a t-Boc PHS resin from wet t-Boc PHS resin, wherein said t-Boc PHS resin comprises monomer units I having the formula

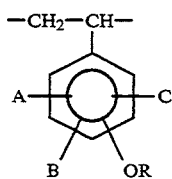

wherein A, B, and C are alike or different and are selected from the group consisting of H, Cl, F, $C_1$ to $C_4$ alkyl groups and mixtures thereof; wherein some or all of the groups R are represented by the formula

and the remainder of the groups R are H; said method comprising the steps of:
(a) dissolving said wet t-Boc PHS resin in a solvent capable of forming an azeotrope with water to form a solution; and
(b) distilling said azeotrope of water and said solvent from said solution until said solution contains less than about 1% by weight of water.

2. The method recited in claim 1, wherein said A, B, and C of said monomer units I are each methyl or H.

3. The method recited in claim 1, wherein said t-Boc PHS consists essentially of monomer units I, where monomer units I are selected from the group consisting of

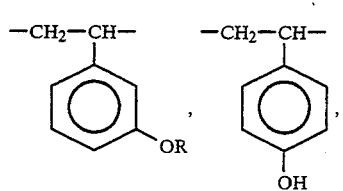

and mixtures thereof.

4. The method recited in claim 3, wherein said monomer units I are

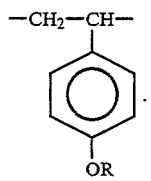

5. The method recited in claim 4, wherein about 5% to about 95% of R are

and about 95% to about 5% of R are H.

6. The method recited in claim 4, wherein about 10% to about 75% of R are

and about 90% to about 25% of R are H.

7. The method recited in claim 1, wherein said solvent is selected from the group consisting of ethylene glycol diethers, ethylene glycol diesters, ethylene glycol ether esters, propylene glycol diethers, propylene glycol diesters, and propylene glycol ether esters.

8. The method recited in claim 4, wherein said solvent is propylene glycol methyl ether acetate.

9. The method recited in claim 5, wherein said solvent is propylene glycol methyl ether acetate.

10. The method recited in claim 4, wherein said step of distilling said azeotrope of water and solvent is carried out in the temperature range of about 25° to about 40° C. at a pressure of about 15 mm to about 50 mm Hg.

11. The method recited in claim 8, wherein said step of distilling said azeotrope of water and solvent is carried out at a pressure of about 20 mm Hg to about 30 mm Hg and a temperature in the range of about 25° C. to about 40° C.

12. The method recited in claim 1, wherein said solution after said step (b) of distilling said azeotrope of water and said solvent contains less than about 0.6% by weight of water.

13. The method recited in claim 1, wherein said solution after said step (b) of distilling said azeotrope of water and said solvent comprises about 5% to about 50% by weight of said t-Boc PHS resin.

14. The method recited in claim 1, wherein said t-Boc PHS resin also comprises monomer units selected from the group consisting of styrene, $C_1$ to $C_4$ alkylstyrene, $C_1$ to $C_4$ alkoxystyrene, chlorostyrene, fluorostyrene, vinyl pyridine and mixtures thereof.

15. The product made by the method of claim 1.

16. The product made by the method of claim 4.

17. The product made by the method of claim 8.

18. The product made by the method of claim 13.

19. A solution consisting essentially of (a) about 5% to about 50% by weight of a resin that consists essentially of monomer units I, where I has the formula

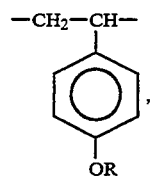

and wherein some or all of the groups R have the formula

and the remainder of the groups R are H; (b) less than about 1% by weight of water; and (c) about 50% to about 95% by weight of propylene glycol methyl ether acetate.

20. The solution recited in claim 19, wherein about 5% to about 95% of the groups R have the formula

and about 95% to about 5% of the groups R are H, wherein the amount of water is less than about 0.6% by weight.

* * * * *